United States Patent [19]

Eitner, Jr. et al.

[11] Patent Number: 5,020,689

[45] Date of Patent: Jun. 4, 1991

[54] METERING AND DISPENSING SYSTEM

[75] Inventors: Joseph G. Eitner, Jr., Park Ridge; Robert J. Tice, Jr., Stockholm, both of N.J.

[73] Assignee: The Wellcome Foundation Limited, London, England

[21] Appl. No.: 428,852

[22] Filed: Oct. 27, 1989

[51] Int. Cl.⁵ .............................................. G01F 11/00
[52] U.S. Cl. .................................... 222/1; 222/630; 222/399; 222/145; 222/444; 239/308; 239/366; 239/368; 239/369; 239/373; 137/101.11; 137/205.5; 406/109; 406/127; 169/15; 169/85
[58] Field of Search .................. 222/1, 4, 145, 630, 222/637, 444, 133, 399; 239/308, 366, 368, 369, 373; 406/109, 127, 130, 131, 146; 169/14, 15, 44, 85; 137/101.11, 205.5

[56] References Cited

U.S. PATENT DOCUMENTS 4,688,946 8/1987 Latif ................................. 366/182

Primary Examiner—Andres Kashnikow
Assistant Examiner—A. Pomrening
Attorney, Agent, or Firm—Ladas & Parry

[57] ABSTRACT

The invention is concerned with a method and apparatus for dispersing an active ingredient, such as a fumigant. The active ingredient is placed in a container and a pressurized solvent/propellent is subsequently introduced. The solvent/propellent expands to adopt a liquid phase and a gaseous phase. The liquid phase serves to absorb the active ingredient and the gaseous phase serves to propel the borne active ingredient out of the apparatus where further expansion takes place and the active ingredient is dispersed in a fog or mist.

18 Claims, 2 Drawing Sheets

METERING AND DISPENSING SYSTEM

BACKGROUND OF THE INVENTION

The invention relates to the dispensing of a gaseous charge of an active ingredient. The invention is generally applicable to the dispersing of atomized sprays and finds particular use in the spraying of insecticides.

However, the invention is equally applicable to the dispensing of room fresheners, fertilizers and any other active ingredients which are capable of being borne in an atomized mist.

The invention finds particular applicability where a specific volume of atomized spray is to be dispensed. For example, if a warehouse is to be sprayed with a view to exterminating a particular insect, then the concentration and amount of insecticide must be carefully calculated. The dispensing system of the present invention is capable of dispensing that calculated amount into a specifically confined volume of air. This represents an advance over previous spray systems where either an entire volume was dispensed until the dispensing medium was exhausted or control valves were selectively closed on a hit or miss basis when it was felt that sufficient volume had been dispensed.

The invention is also applicable to charge portable cylinders of pressurized fumigant, etc. for manual dispersal.

SUMMARY OF THE INVENTION

U.S. Pat. No. 4,488,946 to Latif et al is concerned with the automatic mixing of a quantity of liquid compound and liquid propellent. The Latif system is complex in nature including a multiplicity of valves and cylinders. The complexity of the Latif system makes automation with long term reliability difficult and, moreover, is not susceptible to closely controlled dispersal of an accurately determined amount of active ingredient.

In its broadest concept the system of the invention utilizes a solvent/carrier in liquid form. That solvent/carrier would most conveniently be contained in a large volume supply cylinder. A sample or dosing cylinder containing active ingredient is located downstream of the supply cylinder and is coupled thereto by a conduit. The most convenient solvent/carrier is liquid carbon dioxide and the active ingredient is most usually in liquid form. Valve means are arranged selectively to place the supply cylinder in direct connection with the sample or dosing cylinder while closing any exit from the dosing cylinder to atmosphere or to isolate the supply cylinder and connect the dosing cylinder to atmosphere. In this manner, liquid carbon dioxide will flow in liquid form, from the supply cylinder to the sample cylinder. Upon introduction into the sample cylinder, the liquid carbon dioxide will expand until a steady state of equilibrium is reached in which the sample cylinder contains both liquid carbon dioxide and gaseous carbon dioxide. Once this steady state is reached, the system is in equilibrium and it is not, at this stage, necessary to isolate the supply cylinder since, under constant temperature and pressure conditions, the sample cylinder cannot be overfilled.

The liquid carbon dioxide within the sample cylinder acts as a solvent and absorbs all of the active ingredient which had been placed in the sample cylinder. The gaseous carbon dioxide does not act as a solvent but, instead, acts as a propelling medium to propel the absorbed active ingredient from the system when the sample cylinder is connected to atmosphere.

From the foregoing, it will be appreciated that the maximum amount of active ingredient that can be dispensed is the amount of active ingredient which had been placed in the sample cylinder prior to the introduction of solvent/carrier (liquid carbon dioxide) from the supply cylinder.

According to one aspect of the invention the method of mixing and dispensing an active ingredient includes the steps of placing a charge of active ingredient in a container, introducing a liquid solvent/propellent from a pressurized source into said container, permitting said liquid solvent/propellent to expand within said container until a steady state is reached in which all of the active ingredient charge is absorbed by liquid solvent/propellent and a volume of pressurized gaseous solvent/propellent which has not interacted with said active ingredient partially occupies said container, thereafter isolating the source of liquid solvent/propellent from the container and venting said container to atmosphere whereupon the liquid portion of solvent/propellent is expelled under pressure from the gaseous portion and vaporizes to disperse a mist of borne particles of active ingredient.

This method may be carried out by apparatus including a source of solvent/propellent, a sample cylinder for containing a charge of active ingredient, a first conduit connecting said source with said sample cylinder, a three-way valve interposed in said first conduit and a second conduit leading from said three-way valve to a dispensing nozzle, said three-way valve being operable selectively to place said source and sample cylinder in communication while isolating said dispensing nozzle and to place said sample cylinder and dispensing nozzle in communication while isolating said source.

According to a further aspect of the invention, there is provided a method of mixing and dispensing an active ingredient, including the steps of placing a charge of active ingredient in a sample cylinder, connecting said sample cylinder to a pressurized source of liquid solvent/propellent, dividing the flow of said liquid solvent/propellent upstream of said sample cylinder to cause a first portion of said liquid solvent/propellent to flow into said sample cylinder to both absorb and force out said active ingredient and a second portion of said liquid solvent/propellent to by-pass said sample cylinder, coupling an outlet from said sample cylinder to said by-pass portion, creating a pressure differential between said sample cylinder outlet and said by-pass portion upstream of said coupling to enable total absorption of the active ingredient whereupon said active ingredient passes through the outlet and said by-passed portion of solvent/propellent absorbs and propels said absorbed active ingredient to a discharge station at which all liquid solvent/propellent vaporizes to discharge a mist of active ingredient particles.

This dispensing of a predetermined amount of vaporized active ingredient to atmosphere may be achieved by an apparatus including a source of solvent/propellent, a sample cylinder for containing a charge of active ingredient, a first conduit extending between said source and an inlet of said sample cylinder, a first junction located in said first conduit intermediate said source and said sample cylinder, a second conduit extending from said first junction to by-pass said sample cylinder, a third conduit extending from an outlet of said sample cylinder to join said second conduit, a first flow restrictor interposed in said third conduit intermediate the sample cylinder outlet and a second junction with said second conduit and a second flow restrictor interposed in said second conduit downstream of said first junction and upstream of said second junction with said third conduit, said second flow restrictor being of higher pressure rating than said first flow restrictor.

According to a still further aspect of the invention there is provided a method of mixing and dispensing a predetermined amount of vaporized active ingredient to atmosphere including the steps of passing liquid solvent/propellent from a pressurized source into a dosing cylinder of fixed volume to fill said dosing cylinder, isolating said source from said dosing cylinder, coupling said dosing cylinder, via a junction, with a sample cylinder containing a charge of active ingredient, utilizing said junction to divide flow of liquid solvent/propellent from the dosing cylinder upstream of said sample cylinder to cause a first portion of liquid solvent/propellent to flow into said sample cylinder and both absorb and force out said active ingredient and a second portion of said liquid solvent/propellent to by-pass said sample cylinder, coupling an outlet from said sample cylinder to said by-pass portion, creating a pressure differential between said sample cylinder outlet and said by-pass portion upstream of said coupling to enable total absorption of the active ingredient whereupon said active ingredient passes through the outlet and said by-passed portion of solvent/propellent absorbs and propels said absorbed active ingredient to a discharge station at which all liquid solvent/propellent vaporizes to discharge a mist of active ingredient particles.

This method may be carried out by apparatus including a source of solvent/propellent, a dosing cylinder coupled to said source, a three-way valve interposed between said dosing cylinder and said source, a sample cylinder for containing a charge of active ingredient, a first conduit extending between said three-way valve and an inlet of said sample cylinder, a first junction located in said first conduit intermediate said three-way valve and said sample cylinder, a second conduit extending from said first junction to by-pass said sample cylinder, a third conduit extending from an outlet of said sample cylinder to join said second conduit, a first flow restrictor interposed in said third conduit intermediate the sample cylinder outlet and a second junction with said second conduit and a second flow restrictor interposed in said second conduit downstream of said first junction and upstream of said second junction with said third conduit, said second flow restrictor being of higher pressure rating than said first flow restrictor.

As already explained, liquid carbon dioxide is the preferred solvent/propellent. The active ingredient will depend upon the function to be performed and, consequently, a number of compounds may be used, including but not limited to repellents, antibacterials, fungicides, germicides, deodorants, antivirals, virals, biologicals, ripening agents, growth regulators such as methoprene, hydroprene, dimilin and fenoxycarb and antisprouting compounds, the preferred active ingredient chemicals of this invention are natural pyrethrum and synthetic pyrethroids. Pyrethrum is a pyrethrin, a botanical insecticide the active constituents of which are pyrethrins I and II and jasmolin I and II collectively known as "pyrethrins". The synthetic pyrethroids include allethrin, bifenthrin, bioresmethrin, cyfluthrin, cypermethrin, fenothrin, deltamethrin, esbiothrin, enothrin, fenvalerate, fluvalinate, lamda cyhalothrin, permethrin, resmethrin, tetramethrin, tralomethrin.

It is envisioned that multiple concentrations of active ingredient chemicals to solvent/propellent on a weight to weight basis are possible. The limiting factor being the solubility of the active ingredient chemical in the solvent/propellent. A 0.5% natural pyrethrum formula, that is 0.5% pyrethrins, 4.0% piperonyl butoxide, 7.9% petroleum distillate and 87.6% liquid carbon dioxide, may be used. This formula is recommended at the following dose (use) rates:
1. Flying Insects: 8 grams per 1,000 cubic feet
2. Crawling Insects: 16 grams per 1,000 cubic feet
3. Saw Toothed Grain and Cigarette Beetles: 24 grams per 1,000 cubic feet at 2 hours of exposure
4. Tribolium: Aid to control This can be expressed as a level of pyrethrum or, stated another way, the amount of 100% active ingredient pyrethrum in the above formula. The level of active ingredient is the controlling aspect. It does not matter if that level comes from a 3%, 1% or 0.5% formula. In other words, $2 \times 0.5\%$ formula is equivalent to $1 \times 1\%$ formula.
1. Flying Insects: 0.04 grams AI/1,000 cubit feet
2. Crawling Insects: 0.08 grams AI/1,000 cubic feet
3. Saw Toothed Grain and Cigarette Beetle: 0.12 grams AI/1,000 cubic feet
4. Tribolium: Aid to control

BRIEF DESCRIPTION OF THE DRAWINGS

In order that the invention may be more clearly understood, preferred embodiments thereof will be described with reference to the accompanying drawings in which:

Referring now to the drawings, FIG. 1 is a simple arrangement incorporating a source of solvent/propellent. That source is most conveniently in the form of a cylinder 1 but may, if a large volume is required, be a plurality of cylinders interconnected by a manifold. The cylinder 1 is connected to a three way-valve 2 by a conduit and the valve interconnects the source cylinder 1 with a sample or dosing cylinder 3 and a dispensing nozzle 4.

Figure 2:
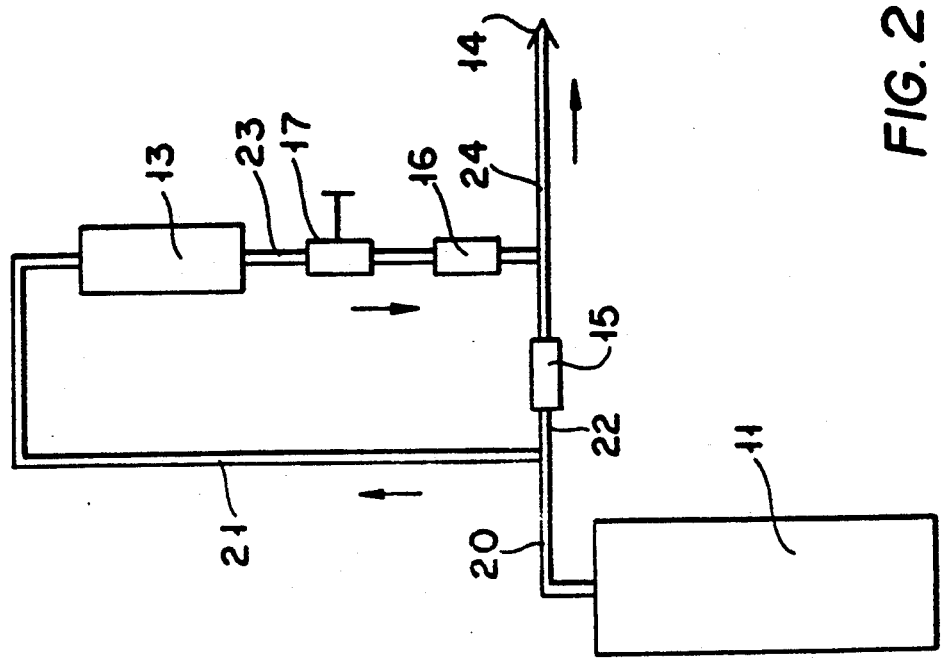
FIG. 2 is a schematic representation of a preferred system of the invention.

In the example described with reference to the schematic illustration of FIG. 1, the solvent/propellent is liquid carbon dioxide and the active ingredient is a desired composition such as listed in the foregoing paragraphs of this specification. The example will also be described in connection with the desired dispersal of the active ingredient in mist form in the amount required to fumigate, or otherwise treat, an enclosure a known measured volume. With that known volume to be permeated, and with the system at rest with the valve 2 isolating the solvent propellent, a calculated amount of active ingredient is placed in the cylinder 3.

In order to ready the charge for dispersal, the valve 2 is turned to connect the cylinder 1 with the cylinder 3 while isolating the dispensing nozzle 4. The solvent/propellent, in this case liquid carbon dioxide, is under pressure (approximately 840 psi) and enters and fills the cylinder 3. At this stage it is unnecessary further to manipulate the valve 2 since, under constant conditions of temperature and pressure, a state of equilibrium will be reached between the cylinders 1 and 3 and the cylinder 3 cannot be overfilled. Upon entering the cylinder 3, the pressurized liquid carbon dioxide will partially evaporate before the state of equilibrium is reached at which point within the cylinder 3 there will be a portion of liquid carbon dioxide and a portion of gaseous carbon dioxide. The liquid portion acts as a solvent and totally absorbs the measured amount of active ingredient which had been placed in the cylinder 3. The gaseous portion of carbon dioxide does not act as a solvent.

The pressure of liquid carbon dioxide remaining in the cylinder 1 is sufficient to prevent any backflow of absorbed active ingredient from the cylinder 3 to the cylinder 1 and, consequently, it is not necessary further to manipulate the valve 2 at this stage.

When it is desired to fumigate or otherwise fill the enclosure, the valve 2 is then manipulated (a) to isolate the source of solvent/propellent and (b) to connect the cylinder 3 with the dispensing nozzle 4. With the cylinder 3 in communication with the nozzle 4 through the shown conduits, the cylinder 3 is effectively vented to atmosphere whereupon the gaseous portion of the carbon dioxide acts as a propellent to expel the liquid portion of the carbon dioxide together with the active ingredient absorbed thereby through the dispensing nozzle 4. Upon exiting through the dispensing nozzle the liquid carbon dioxide further expands to form a mist of borne particles of active ingredient into the enclosure.

Figure 1:
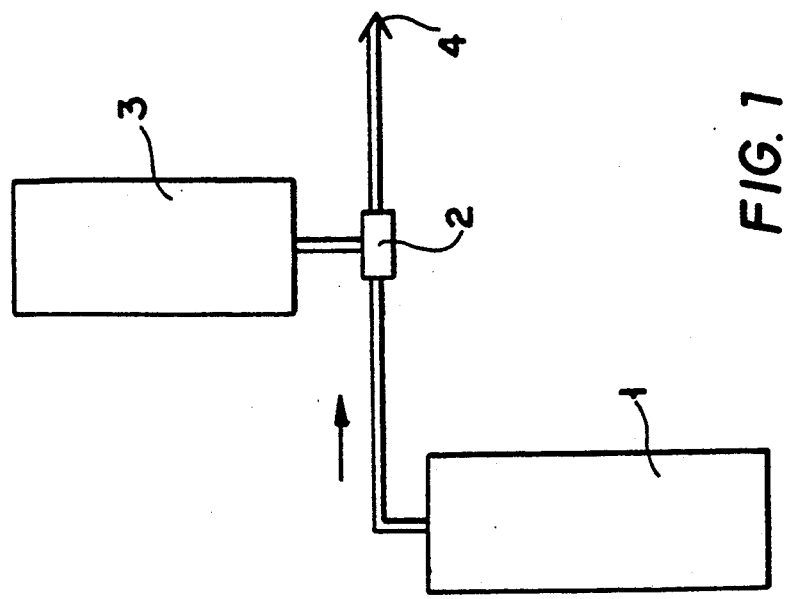
FIG. 1 is a schematic representation of a simplified system embodying the concept of the invention.

From the foregoing description of the embodiment shown in FIG. 1 of the drawings, it will be appreciated that a metered amount of active ingredient is dispensed and, consequently, neither more nor less active ingredient will be dispersed than is necessary for the desired purpose. The system is extremely simple in nature requiring essentially only one moving part, i.e. the valve 2, two cylinders, one of liquid carbon dioxide to act as a solvent/propellent and the other to receive a calculated charge of active ingredient, and conduits interconnecting the component parts and leading to a dispensing nozzle. The conduits are preferably flexible hoses with quick disconnect attachments at their ends not only to permit convenient and rapid assembly and dismantling of the system but also to facilitate replacement of spent cylinders.

A preferred embodiment of the invention is shown in FIG. 2 of the drawings. That preferred embodiment again includes a source of solvent/propellent in the form of a cylinder 11 of liquid carbon dioxide and a cylinder 13 for containing active ingredient. Conduits not only interconnect the cylinders 11 and 13 but also lead to a dispensing outlet 14.

The embodiment shown in FIG. 2 is capable either of dispersing a metered amount of active ingredient or of exhausting a total supply of active ingredient. Whichever of these alternative dispersals is desired, the system and operation is the same. In the event that a metered amount of active ingredient is to be dispersed, then, as in the case of the embodiment described with reference to FIG. 1, a calculated amount of active ingredient is placed in the cylinder 13. In the event that total dispersing is desired, then the cylinder 13 is filled with active ingredient. A conduit 20 leads from the cylinder 11 to a junction where it branches into two separate conduits 21 and 22. The conduit 21 leads directly to an inlet to the cylinder 13 whereas the conduit 22 leads to a first check valve 15. A further conduit 23 extends from the exit of the cylinder 13 to a second check valve 16 and then to a junction where the conduit 23 joins with the conduit 22 downstream of said first and second check valves and from there to a conduit 24 to said dispensing nozzle 14. A further valve 17 is interposed in the conduit 23 downstream from the cylinder 13 and upstream from the second check valve 16. This further valve 17 is effectively an on/off valve or "tap".

Before solvent/propellent is permitted to flow from the cylinder 11 out through the conduit 20, the second check valve 16 will prevent the active ingredient from running out of the sample of dosing cylinder 13 due to gravity. This prevention will be effective even where, as in the preferred example, the active ingredient is in liquid form.

For reasons which will be apparent from the following description of the embodiment shown in FIG. 2, the first check valve 15 is gaged or calibrated to provide a substantially greater resistance to flow than the check valve 16. Conventional spring check valves can be used for this purpose and, in this preferred embodiment, the ratio is approximately 10:1.

In a case where it is not critical to dispense a metered amount of active ingredient, the sample cylinder 13 is filled with active ingredient and the cylinder 11 is charged with solvent/propellent. As in the case of the embodiment described with reference to FIG. 1, the preferred solvent/propellent is liquid carbon dioxide. That liquid carbon dioxide will flow from the cylinder 11 through the conduit 20 and will encounter substantial resistance imposed by the first check valve 15. Consequently, the liquid carbon dioxide will preferentially flow from the junction through the conduit 21 and into the cylinder 13 of active ingredient. Upon entering the cylinder 13 the pressurized liquid carbon dioxide acts in two ways. Firstly, as in the embodiment of FIG. 1, the liquid carbon dioxide will expand to create a liquid portion and a gaseous portion, with the liquid portion acting as a solvent to absorb the active ingredient and the gaseous portion remaining inactive. Secondly, the pressure of the liquid carbon dioxide will force unabsorbed active ingredient out of the cylinder 13 throught conduit 23. Thus, if the on/off tap 17 is open, the gaseous portion of the carbon dioxide will act as a propellent to expel both the absorbed and unabsorbed active ingredient through the conduit 23 and through the second check valve 16. As the check valve 16 imposes substantially less resistance to passage than the check valve 15, the absorbed and unabsorbed active ingredient will pass therethrough into the conduit 24. As the line or conduit leading to and through the sample or dosing cylinder 13 is at a higher pressure than liquid carbon dioxide at the junction where the conduit 23 joins the conduit downstream of the check valve 15, the unabsorbed active ingredient forced through the conduit 23 will be injected into liquid carbon dioxide flowing through the conduit 22 downstream of the check valve 15 and will be fully absorbed at that point before passing through the conduit 24 to the dispensing nozzle 14.

Upon exiting from the dispensing nozzle 14, the liquid carbon dioxide bearing the absorbed active ingredient will rapidly expand causing a fogging or misting. This state will continue until all of the active ingredient which had previously been placed in the cylinder 13 is dispersed whereupon no fogging or misting will occur at the dispensing nozzle 14 and, instead, there will merely be the noise of expanding and vaporizing liquid carbon dioxide. At this point the system can be closed down by isolating the solvent/propellent source cylinder 11 by valve means (not shown) and the sample or dosing cylinder recharged with active ingredient.

If, on the other hand, it is again desired to meter a controlled amount of active ingredient into the controlled environment, then only a calculated amount of active ingredient is placed in the cylinder 13 prior to start up and the valve or tap 17 is closed to prevent egress of any absorbed active ingredient. Upon opening the valve or tap 17, any unabsorbed active ingredient will be absorbed upon injection into the stream of solvent/propellent passing through the check valves 15 and, thereafter, all absorbed active ingredient will be discharged as described and, again, the system can be temporarily closed down when no misting or fogging is observed to occur at the discharge nozzle 14.

Figure 3:
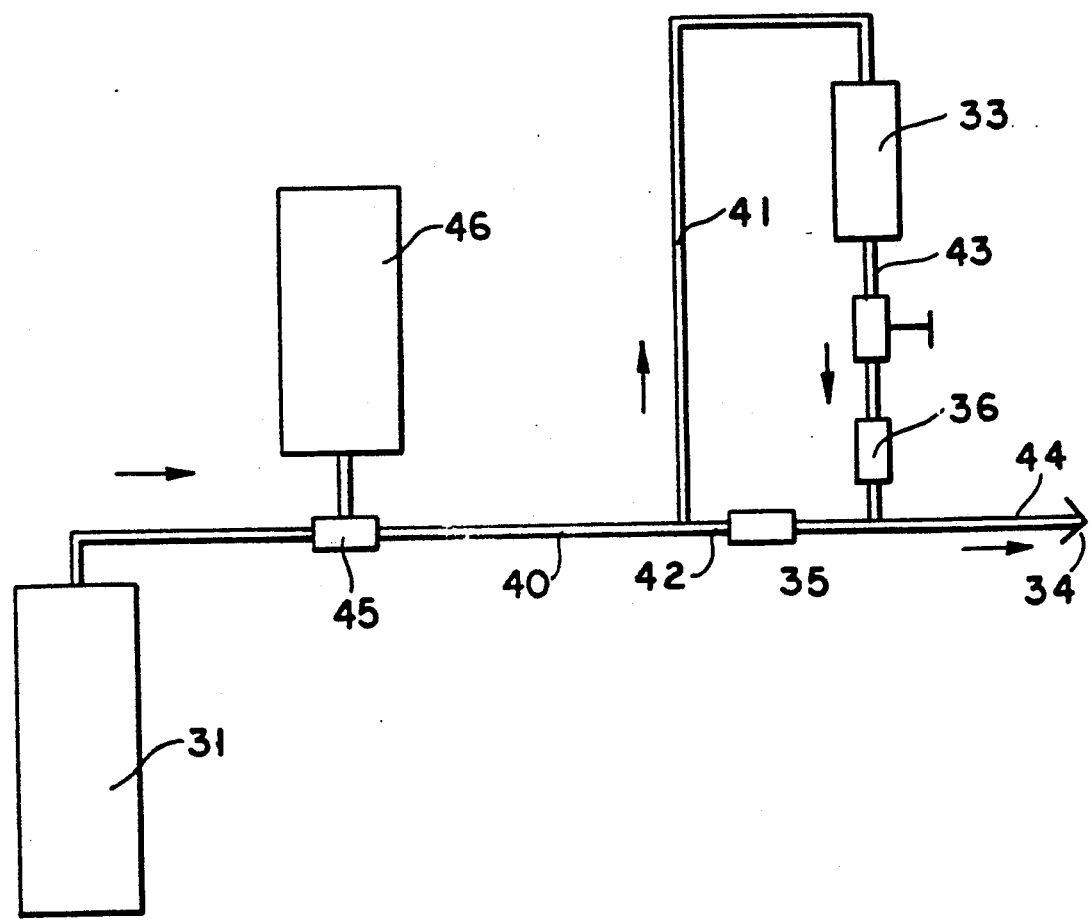
FIG. 3 is a schematic representation of a still further embodiment of the invention.

The embodiment shown in FIG. 3 represents a modification of the embodiment shown in FIG. 2 and described in the preceding paragraphs. The embodiment shown in FIG. 3, like that shown in FIG. 2, serves totally to dispense all of an amount of active ingredient placed in a sample cylinder 33. The system in FIG. 3 is similar to that FIG. 2 and, to this end, includes a cylinder 31 containing a source of solvent propellent, a conduit 40 leading from the cylinder 31 to a junction from which conduits 41 and 42 lead respectively to an inlet of the sample cylinder 33 and to a first check valve 35. A further conduit 43 leads from the outlet of the sample cylinder 33 to a coupling, downstream of the first check valve 35, with the conduit 42 and a conduit 44 leads from that coupling to a dispensing nozzle 34. A second check valve 36 is interposed in the conduit 43 and creates a lesser restriction to flow than the first check valve 35. In the foregoing respects, the embodiment of FIG. 3 is similar to that shown in FIG. 2. However, the embodient of FIG. 3 includes a three-way valve 45 interposed in the conduit 40 and a dosing cylinder 46 which may selectively be coupled with the conduit 40 via said three-way valve 45. In this manner, a controlled volume of solvent/propellent can be isolated from the source provided by the cylinder 31 and thereafter the source cylinder 31 can be isolated and the total controlled volume expelled, with absorbed active ingredient, through the dispensing nozzle 34.

The system illustrated in FIG. 3 is prepared by adjusting the three-way valve 45 to isolate the supply of solvent/propellent in the cylinder 31. The cylinder 33 is filled with active ingredient. The three-way valve 45 is then manipulated to provide a flow connection between the cylinder 31 and the cylinder 46 while isolating the conduit 40 downstream of said valve 45. Solvent/propellent, again most conveniently liquid carbon dioxide, will flow from the cylinder 31 to the cylinder 46 until a state of equilibrium is reached. In order to disperse the active ingredient, the three-way valve 45 is then manipulated again to isolate the cylinder 31 while placing the cylinder 46 in communication with the conduit 40. Thereafter, the cylinder 46 is totally discharged entraining the active ingredient in the manner described in the embodiment of FIG. 2 and dispersing the active ingredient throught the dispensing nozzle 34.

In the preceding embodiments, the absorbed active ingredient has been described as being discharged from a nozzle 4, 14 or 34. It will be appreciate that in a warehouse or factory to be fumigated, the discharge nozzle is most likely to take the form of an overhead sprinkler system from which the active ingredient can be uniformly dispersed throughout the contained volume.

The preceding preferred embodiments of the invention have been described with specific reference to the configurations shown in FIG. 1 and 2 of the drawings. These configurations can, of course, be modified as appropriate. For example, in the embodiments shown in FIGS. 2 and 3, instead of rated or calibrated first and second check valves, flow restriction orifices can be provided respectively in the conduits 22, 42 and 23, 43. In this case, the size of the orifice in the conduits 22, 42 will be substantially smaller than the size of the orifice in the conduit 23, 43 and, again, a ratio of 10:1 may be adopted.

What is claimed is:

1. A method of mixing and dispensing an active ingredient including the steps of placing a charge of active ingredient in a container, introducing a liquid solvent/propellent from a pressurized source into said container, permitting said liquid solvent/propellent to expand within said container until a steady state is reached in which all of the active ingredient charge is absorbed by liquid solvent/propellent and a volume of pressurized gaseous solvent/propellent which has not interacted with said active ingredient partially occupies said container, thereafter isolating the source of liquid solvent/propellent from the container and venting said container to atmosphere whereupon the liquid portion of solvent/propellent is expelled under pressure from the gaseous portion and vaporizes to disperse a mist of borne particles of active ingredient.

2. A method according to claim 1, characterized in that the solvent/propellent is liquid carbon dioxide.

3. A method according to claim 1, wherein the charge of active ingredient is in liquid form.

4. Apparatus for carrying out the method of claim 1, including a source of solvent/propellent, a sample cylinder for containing a charge of active ingredient, a first conduit connecting said source with said sample cylinder, a three-way valve interposed in said first conduit and a second conduit leading from said three-way valve to a dispensing nozzle, said three-way valve being operable selectively to place said source and sample cylinder in communication while isolating said dispensing nozzle and to place said sample cylinder and dispensing nozzle in communication while isolating said source.

5. A method of mixing and dispensing an active ingredient, including the steps of placing a charge of active ingredient in a sample cylinder, connecting said sample cylinder to a pressurized source of liquid solvent/propellent, dividing the flow of said liquid solvent/propellent upstream of said sample cylinder to cause a first portion of said liquid solvent/propellent to flow into said sample cylinder to both absorb and force out said active ingredient and a second portion of said liquid solvent/propellent to by-pass said sample cylinder, coupling an outlet form said sample cylinder to said by-pass portion, creating a pressure differential between said sample cylinder outlet and said by-pass portion upstream of said coupling to enable total absorption of the active ingredient whereupon said active ingredient passes through the outlet and said by-passed portion of solvent/propellent absorbs and propels said absorbed active ingredient to a discharge station at which all liquid solvent/propellent vaporizes to discharge a mist of active ingredient particles.

6. A method according to claim 5, wherein said pressure differential between said sample cylinder outlet and said by-pass portion is created by interposing a first flow restriction between the outlet of said sample cylinder and said coupling and a second flow restriction of higher pressure rating in the by-pass upstream of said coupling.

7. A method to claim 5, characterized in that the solvent/propellent is liquid carbon dioxide.

8. A method according to claim 5, wherein the charge of active ingredient is in liquid form.

9. Apparatus for carrying out the method of claim 5, including a source of solvent/propellent, a sample cylinder for containing a charge of active ingredient, a first conduit extending between said source and an inlet of said sample cylinder, a first junction located in said first conduit intermediate said source and said sample cylinder, a second conduit extending from said first junction to by-pass said sample cylinder, a third conduit extending from an outlet of said sample cylinder to join said second conduit, a first flow restrictor interposed in said third conduit intermediate the sample cylinder outlet and a second junction with said second conduit and a second flow restrictor interposed in said second conduit downstream of said first junction and upstream of the said second junction with said third conduit, said second flow restrictor being of higher pressure rating than said first flow restrictor.

10. Apparatus according to claim 9, wherein the first and second flow restrictors are first and second check valves.

11. Apparatus according to claim 9, wherein the pressure rating of the second flow restrictor is approximately ten times the pressure rating of the first flow restrictor.

12. A method of mixing and dispensing a predetermined amount of vaporized active ingredient to atmosphere including the steps of passing liquid solvent/propellent from a pressurized source into a dosing cylinder of fixed volume to fill said dosing cylinder, isolating said source from said dosing cylinder, coupling said dosing cylinder, via a first junction, with a sample cylinder containing a charge of active ingredient, utilizing said first junction to divide flow of liquid solvent/propellent from the dosing cylinder upstream of said sample cylinder to cause a first portion of liquid solvent/propellent to flow into said sample cylinder and both absorb and force out said active ingredient and a second portion of said liquid solvent/propellent to by-pass said sample cylinder, coupling an outlet from said sample cylinder to said by-pass portion, creating a pressure differential between said sample cylinder outlet and said by-pass portion upstream of said coupling to enable total absorption of the active ingredient whereupon said active ingredient passes through the outlet and said by-passed portion of solvent/propellent absorbs and propels said absorbed active ingredient to a discharge station at which all liquid solvent/propellent vaporizes to discharge a mist of active ingredient particles.

13. A method according to claim 12, wherein said pressure differential between said sample cylinder outlet and said by-pass portion is created by interposing a first flow restriction between the outlet of said sample cylinder and said coupling and a second flow restriction of higher pressure rating in the by-pass upstream of said coupling.

14. A method according to claim 12, characterized in that the solvent/propellent is liquid carbon dioxide.

15. A method according to claim 12, wherein the charge of active ingredient is in liquid form.

16. Apparatus for carrying out the method of claim 12, including a source of solvent/propellent, a dosing cylinder coupled to said source, a three-way valve interposed between said dosing cylinder and said source, a sample cylinder for containing a charge of active ingredient, a first conduit extending between said three-way valve and an inlet of said sample cylinder, said first junction located in said first conduit intermediate said three-way valve and said sample cylinder, a second conduit extending from said first junction to by-pass said sample cylinder, a third conduit extending from an outlet of said sample cylinder to join said second conduit, a first flow restrictor interposed in said third conduit intermediate the sample cylinder outlet and second junction with said second conduit and a second flow restrictor interposed in said second conduit downstream of said first junction and upstream of said second junction with said third conduit, said second flow restrictor being of higher pressure rating than said first flow restrictor.

17. Apparatus according to claim 16, wherein the first and second flow restrictors are first and second check valves.

18. Apparatus according to claim 16, wherein the pressure rating of the second flow restrictor is approximately ten times the pressure rating of the first flow restrictor.

* * * * *